(12) United States Patent
Powell et al.

(10) Patent No.: US 10,856,018 B2
(45) Date of Patent: Dec. 1, 2020

(54) CLOCK SYNCHRONIZATION TECHNIQUES INCLUDING MODIFICATION OF SAMPLE RATE CONVERSION

(71) Applicant: Apple Inc., Cupertino, CA (US)

(72) Inventors: Richard M. Powell, Mountain View, CA (US); Ashley I. Butterworth, Santa Clara, CA (US); Anthony J. Guetta, San Carlos, CA (US); Daniel C. Klingler, Mountain View, CA (US); Jeffrey C. Moore, Cupertino, CA (US); Alexander C. Powers, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 594 days.

(21) Appl. No.: 15/436,401

(22) Filed: Feb. 17, 2017

(65) Prior Publication Data
US 2017/0289231 A1 Oct. 5, 2017

Related U.S. Application Data

(63) Continuation of application No. 15/014,736, filed on Feb. 3, 2016, now abandoned.

(60) Provisional application No. 62/235,407, filed on Sep. 30, 2015.

(51) Int. Cl.
| | |
|---|---|
| *H04L 29/06* | (2006.01) |
| *H04N 21/2343* | (2011.01) |
| *H04N 21/43* | (2011.01) |
| *H04N 21/643* | (2011.01) |
| *H04N 21/242* | (2011.01) |
| *H04N 21/436* | (2011.01) |

(Continued)

(52) U.S. Cl.
CPC ... *H04N 21/234381* (2013.01); *H04L 65/601* (2013.01); *H04N 21/242* (2013.01); *H04N 21/4302* (2013.01); *H04N 21/4305* (2013.01); *H04N 21/4307* (2013.01); *H04N 21/439* (2013.01); *H04N 21/43615* (2013.01); *H04N 21/440281* (2013.01); *H04N 21/643* (2013.01)

(58) Field of Classification Search
CPC ......... H04N 21/234381; H04N 21/242; H04N 21/4302; H04N 21/4305; H04N 21/4307; H04N 21/43615; H04N 21/439; H04N 21/440281; H04N 21/643; H04L 65/601
See application file for complete search history.

(56) References Cited

U.S. PATENT DOCUMENTS

| | | | |
|---|---|---|---|
| 7,996,700 B2 * | 8/2011 | Celinski | G06F 1/12 713/400 |
| 8,234,395 B2 | 7/2012 | Millington | |
| 8,762,580 B2 | 6/2014 | Rajapakse | |

(Continued)

*Primary Examiner* — Clayton R Williams
*Assistant Examiner* — Christopher B Robinson
(74) *Attorney, Agent, or Firm* — BakerHostetler

(57) ABSTRACT

Methods and systems provide control of media synchronization using time stamp pairs. In an embodiment, a first device may request a time stamp from a second device. The first device may determine any de-synchronization between the first and second devices based on the requested time stamp and characteristics of the request. The first device may define a rate scalar based on the determined de-synchronization. A sample rate conversion may be performed for the first device based on the rate scalar such that the outputs of the first device and the second device are synchronized.

24 Claims, 4 Drawing Sheets

(51) Int. Cl.
 *H04N 21/439* (2011.01)
 *H04N 21/4402* (2011.01)

(56) References Cited

U.S. PATENT DOCUMENTS

| | | | |
|---|---|---|---|
| 8,973,063 B2 | 3/2015 | Spilo et al. | |
| 2004/0187043 A1* | 9/2004 | Swenson | H04N 21/443 713/400 |
| 2005/0039215 A1* | 2/2005 | Lienhart | H04J 3/0667 725/105 |
| 2006/0002681 A1* | 1/2006 | Spilo | H04N 21/4307 386/220 |
| 2007/0179989 A1* | 8/2007 | Maes | G06F 16/273 |
| 2009/0298420 A1* | 12/2009 | Haartsen | H04J 3/0658 455/3.06 |
| 2014/0010515 A1 | 1/2014 | Lee et al. | |
| 2015/0074239 A1* | 3/2015 | Rajapakse | H04L 65/60 709/219 |
| 2015/0092793 A1* | 4/2015 | Aweya | H04J 3/0685 370/503 |
| 2016/0170437 A1* | 6/2016 | Aweya | H04J 3/0667 713/503 |

\* cited by examiner

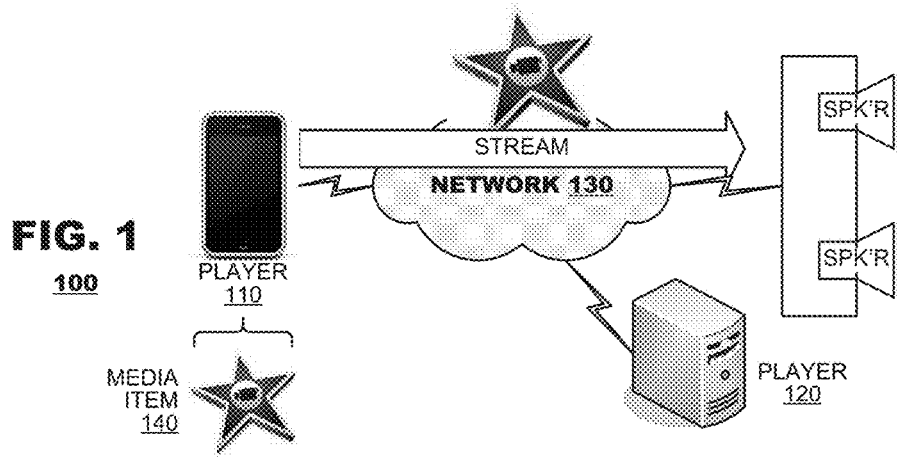

350

300

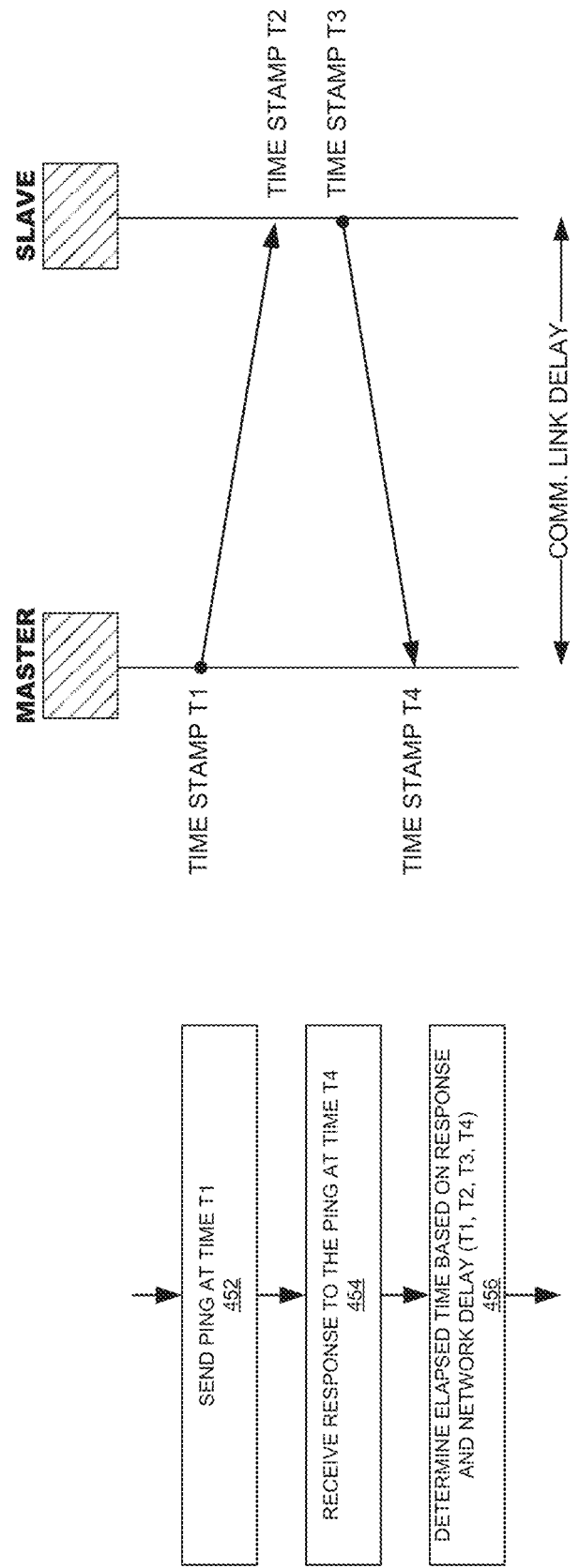

500

600

CLOCK SYNCHRONIZATION TECHNIQUES INCLUDING MODIFICATION OF SAMPLE RATE CONVERSION

CROSS-REFERENCE TO RELATED APPLICATIONS

This application is a continuation of and claims priority to U.S. patent application Ser. No. 15/014,736, filed Feb. 3, 2016 and entitled "Clock Synchronization Techniques Including Modification of Sample Rate Conversion," which claimed priority to U.S. Provisional Application Ser. No. 62/235,407, filed Sep. 30, 2015, which was filed concurrently with U.S. patent applications entitled "Music Everywhere" (U.S. Ser. No. 14/871,842), "Earbud Sharing" (U.S. Ser. No. 14/871,839), "Synchronization of Media Rendering in Heterogeneous Networking Environments" (U.S. Ser. No. 14/871,879), and "Shared Content Presentation with Integrated Messaging" (U.S. Ser. No. 14/871,939), the entireties of which are incorporated herein.

BACKGROUND

The present disclosure relates to a method of controlling media playback. More specifically, it relates to methods for synchronizing media playback among one or more devices.

Modern communication protocols support delivery of a host of different types of data, including audio and visual data. For example, Apple Airplay® allows wireless streaming of audio, video, device screens, images, and the like between autonomous devices. In some instances, multiple, otherwise autonomous devices in a common location need to render media in a synchronized fashion. For example, a speaker system may include multiple speakers distributed throughout a room. The speaker system should output audio synchronously to provide a listening experience intended by a recording.

However, devices operate according to their own local clocks, audio-visual rendering hardware, and network communicators. Thus, to synchronously render media, the devices should compensate for skews that may occur in rendering. Such skews may arise to due to manufacturing variations in system components, which may vary from device to device and be difficult to compensate for because they are not known to the device.

Media delivery protocols often require decoding/playback terminals to make requests of media servers for media content that will be decoded and played. A single media item may be segmented into a variety of delivery units ("segments") that are individually requested by a terminal, downloaded and buffered for decode and playback. When two or more terminals decode a common media item, each terminal requests segments from a media server independently of whatever requests are made by other terminals. Within each terminal, a local clock system, such as a crystal oscillator or a phase-locked loop (PLL), may drive a rate of media playback at the device by defining a rate of file consumption. However, clocks, PLLs, and crystal oscillators may vary based on type and manufacturing variations. Over time, a clock may drift, becoming out of sync with respect to another clock. Delays may also be introduced by operating systems, software processing, and network communication delays between devices.

Conventional methods of synchronization, which involve deriving a new clock, can be inefficient and ineffective because devices are required to be familiar with another device's hardware structure. Thus, terminals do not include circuitry to effectively synchronize their local clocks for synchronous, parallel playback. Thus, the inventors perceived a need in the art for synchronizing and controlling media playback.

BRIEF DESCRIPTION OF THE DRAWINGS

FIG. 1 is a block diagram of a clock synchronization system according to an embodiment of the present disclosure.

FIG. 2 is a block diagram of a system including a plurality of synchronizable systems according to an embodiment of the present disclosure.

FIG. 4A a flowchart illustrating a method for clock synchronization to an embodiment of the present disclosure.

FIG. 4B is a conceptual diagram illustrating operation of the method shown in FIG. 4A according to an embodiment of the present disclosure.

DETAILED DESCRIPTION

Figure 3B:
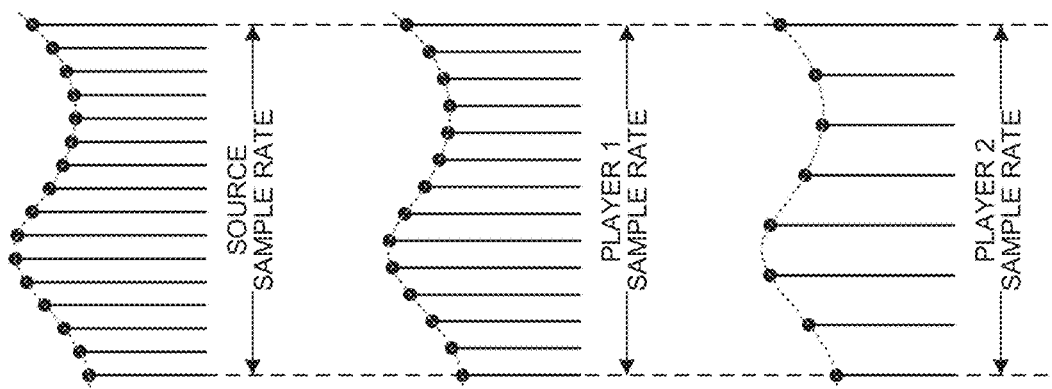
FIG. 3B a conceptual diagram illustrating operation of the method shown in FIG. 3A on an input signal according to an embodiment of the present disclosure.

Methods and systems provide techniques for synchronizing media playback for one or more devices using time stamp pairs. In an embodiment, playback may be synchronized among components of a device using time stamp pairs communicated between the device components. In another embodiment, playback may be synchronized among devices using time stamp pairs communicated between the devices. In an embodiment, the time stamp pairs may be communicated between devices. For example, the time stamp pairs may be communicated via a hardware abstraction layer in each device. The methods and systems may perform synchronization over any communication network or combination of communication networks including wired and wireless connections. Methods of the present disclosure may be device-independent by providing standard operating system calls to hardware. In some instances, one device may be act as a master, while one or more other devices may act as slaves. The slave devices may calculate a respective rate scalar based on a level of de-synchronization between the master and slave. Sample rate conversion (SRC) may be performed based on the rate scalar such that the other (slave) devices appear to consume audio input at the same rate as the master device, and all of the devices may output audio synchronously.

FIG. 1 is a block diagram of a system 100 for clock synchronization according to an embodiment of the present disclosure. The system 100 may include a plurality of media players 110, 120 provided in mutual communication via a network 130. The media players 110, 120 may communicate with each other over the network 130 but they otherwise may operate autonomously from each other. For example, each media player 110, 120 may operate according to its own operating system and application program(s), which may operate independently of the other's operating system and applications. Each media player 110, 120 may have its own rendering systems, which may operate independently of the others' rendering systems. And, while the present disclosure contemplates use of media players 110, 120 that are the same make and model device as each other, the media players' components (not shown) may include manufacturing variations that cause the players 110, 120 to deviate from their ideal operating conditions, which may induce relative skews in the ways that they render media items.

Each media player 110, 120 may process and render media items 140. The media items 140 may be provisioned in a variety of ways. In one embodiment, a first media player 110 may store the media item 140 locally and stream the media item to the other player(s) 120 over the network 130. In other embodiments, the media item 140 may be streamed to each player 110, 120 in real-time as they render the media item 140. The media item 140 may be provided to the players 110, 120 from another source (not shown) on the network 130, such as media server.

The network 130 provides communication between the media players 110, 120 and, as necessary, sources of the media item. The network 130 may be one or more networks that support communication among these devices. For example, the network 130 may be a wired network or a combination of a wired and wireless network.

FIG. 2 is a functional block diagram illustrating a system 200 including a plurality of media players. The example of FIG. 2 illustrates a first player 200.1 and a second player 200.2.

The player 200.1 may include a rendering program 220.1, a time sync manager 210.1, a local clock 250.1, a video rendering system 230.1, an audio rendering system 240.1 and a local clock 250.1. The video rendering system 230.1 may include a video buffer 232.1, a video driver 234.1, and a display device 236.1. The audio rendering system 240.1 may include an audio buffer 242.1, an audio driver 244.1, and a speaker 246.1. Although only one audio path is illustrated in FIG. 2, many players support multi-channel audio; the audio buffer 242.1, audio driver 244.1, and speaker 246.1 illustrated in FIG. 2 may be replicated to support these additional channels.

The rendering program 220.1 may decode a media item and output rendering data to the audio rendering system 240.1 and/or video rendering system 230.1 as dictated by the media item and the player's capabilities. Thus, the rendering program 220.1 may output video data to the video rendering system 230.1 and it may output audio data to the audio rendering system 240.1. The rendering program 220.1 may include processes to decode a media item according to a media coding protocol and format rendering data (e.g., the audio data and/or video data) according to the requirements of the audio rendering system 240.1 and/or video rendering system 230.1 within the player. The rendering program 220.1 may be represented by an operating system of the player 200.1, an application program of the player 200.1, or both.

The video rendering system 230.1 may output video data that it receives from the rendering program 220.1. The video buffer 232.1 may store video data output to it by rendering program 220.1. The video driver 234.1 may retrieve video from the video buffer 232.1 and output the retrieved video via the display 236.1. The video driver 234.1 may output video to the display 236.1 at a data rate defined by the rendering program 220.1 according to a timing reference provided by the local clock 250.1. For example, the rendering program 220.1 may control the video rendering system 230.1 to output video at an identified frame rate, for example, 24 frames/sec. ("fps"), 30 fps, or 60 fps. The video driver 234.1 may derive control signals within the video rendering system 230.1, for example, to retrieve data from the video buffer 232.1 and to drive control signals to the display 236.1, using the clock signal as a timing reference. Thus, if the local clock 250.1 provides a clock signal that is 0.01% faster than its rated clock rate, the video driver 234.1 may generate output data at a frame rate that is 0.01% faster than the frame rate identified by the rendering program 220.1.

The audio rendering system 240.1 may output audio data that it receives from the rendering program 220.1. The audio buffer 242.1 may store audio data output to it by rendering program 220.1. The audio driver 244.1 may retrieve audio from the audio buffer 242.1 and output the retrieved audio via the speaker 246.1. The audio driver 244.1 may output audio to the speaker 246.1 at a data rate defined by the rendering program 220.1 according to a timing reference provided by the local clock 250.1. For example, the rendering program 220.1 may control the audio system 240.1 to output audio at an identified sample rate, for example, 44100 samples/sec. The audio driver 244.1 may derive control signals within the audio system 240.1, for example, to retrieve data from the audio buffer 242.1 and to drive control signals to the speaker 246.1, using the clock signal as a timing reference. Thus, if the local clock 250.1 provides a clock signal that is 0.01% faster than its rated clock rate, the audio driver 244.1 may generate output data at a frame rate that is 0.01% faster than the frame rate identified by the rendering program 220.1.

The audio buffer 242.1 may receive samples from the operating system 220.1. The audio buffer 242.1 may store or forward the received samples to the audio driver 244.1 for decoding. The audio driver 244.1 may receive samples from the audio buffer 242.1. The audio driver 244.1 may decode and/or output samples at a rate defined by the local clock 250.1. The speaker 246.1 may output samples based on the rate at which the audio driver 244.1 is driving the speaker. In an alternative embodiment, the audio buffer 242.1 may buffer samples at a rate defined by the local clock 250.1.

The time synchronization manager 210.1 may determine a level of skew between different players that are rendering a common media item. Having estimates of the level of skew, the time synchronization manager 210.1 may implement measures to correct for such skews in an effort to minimize or, ideally, eliminate them. The time synchronization manager 210.1 may receive a local clock signal from the local clock 250.1.

In one embodiment, the rendering program 220.1 may include a sample rate converter (ASRC) 222.1 that may alter rendering data before it is output to either the video rendering system 230.1 or the audio rendering system 240.1 in an effort to compensate for skew identified by the time synchronization manager 210.1. For example, the ASRC may change a sampling rate of a discrete signal, which was generated using an idealized sampling rate, to obtain a new discrete representation of the signal at a different sampling rate that reflects the skew identified by the time synchronization manager 210.1. For example, the media item may include a file recorded and edited at a relatively high sampling rate, which allows for a greater frequency range to be captured, while the first system is capable of playing files in a smaller range of frequencies. In this case, the ASRC 222.1 may downsample an input file to accommodate the playback abilities of the first system. The display 236.1 and/or the speaker 246.1 may then output the downsampled audio file.

In another embodiment, the local clock 250.1 may include controls that alter a rate of a clock signal CLK that it outputs.

The clock rate may be altered to compensate for skew identified by the time synchronization manager 210.1.

Other embodiments permit both techniques to be applied to a media item, altering the rendering data before it is output from the rendering program 220.1 and altering a rate of a clock signal generated by a local clock 250.1. For this reason, FIG. 2 illustrates a control signal from the ASRC 222.1 to the local clock to alter the rate of its output clock.

The local clock 250.1 may include a plug-in (not shown). The plugin may be configured to determine an amount of de-synchronization and calculate a rate scalar as further described herein. The rate scalar may adjust the sample rate conversion such that the player 200.1 and 200.2 output the media item synchronously.

The second player 200.2 may have an architecture that is similar to that of the first player 200.1. Thus, the second player 200.2 may include a rendering program 220.2, a time sync manager 210.2, a local clock 250.2, a video rendering system 230.2, and an audio rendering system 240.2. The video rendering system 230.2 may include a video buffer 232.2, a video driver 234.2, a local clock 250.2, and a display 236.2. The audio rendering system 240.2 may include an audio buffer 242.2, an audio driver 244.2, and a speaker 246.2. The output by the display 236.2 and the output by the speaker 246.2 may be synchronized according to the methods described herein.

The rendering program 220.2 may receive a media item for decoding and rendering. The rendering program 220.1 may be represented by an operating system of the player 200.1, an application program of the player 200.1. or both. The time sync manager 210.2 may control the local clock 250.2 according to the methods described herein. For example, the time sync manager 210.2 may determine ticks of the local clock 250.2 and adjust the ticks accordingly. The time sync manager 210.2 may receive a local clock signal from the local clock 250.2.

The video buffer 232.2 may receive samples from the rendering program 220.2. The video buffer may store or forward the received samples to the video driver 234.2 for decoding. The video driver 234.2 may receive samples from the video buffer 232.2. The video driver 234.2 may decode and/or output samples at a rate defined by the local clock 250.2. The display 236.2 may render samples based on the rate at which the video driver 234.2 is driving the display. In an alternative embodiment, the video buffer 232.2 may buffer samples at a rate defined by the local clock 250.2.

The audio buffer 242.2 may receive samples from the rendering program 220.2. The audio buffer 242.2 may store or forward the received samples to the audio driver 244.2 for decoding. The audio driver 244.2 may receive samples from the audio buffer 242.2. The audio driver 244.2 may decode and/or output samples at a rate defined by the local clock 250.2. The speaker 246.2 may output samples based on the rate at which the audio driver 244.2 is driving the speaker. In an alternative embodiment, the audio buffer 242.2 may buffer samples at a rate defined by the local clock 250.2.

The rendering program 220.2 may include a sample rater converter (ASRC) 222.2. The rendering program 220.2 may provide a layer of abstraction for underlying hardware. This may allow device-independent functions to be performed regardless of a device's hardware configuration. For example, the rendering program 220.2 may direct underlying hardware to perform requested operations such that a requestor need not be familiar with underlying hardware. In an embodiment, the rendering program 220.2 may be implemented by existing hardware and/or software modules. The ASRC 222.2 may be an asynchronous sample rate converter.

The ASRC may change a sampling rate of a discrete signal to obtain a new discrete representation of an underlying continuous signal. For example, the media item may include a file recorded and edited at a relatively high sampling rate, which allows for a greater frequency range to be captured, while the first system is capable of playing files in a smaller range of frequencies. In this case, the ASRC 222.2 may downsample an input file to accommodate the playback abilities of the first system. The display 236.2 and/or the speaker 246.2 may then output the downsampled audio file.

The local clock 250.2 may include a plug-in (not shown). The plugin may be configured to determine an amount of de-synchronization and calculate a rate scalar as further described herein. The rate scalar may adjust the sample rate conversion such that the player 200.2 and 200.2 output the media item synchronously.

In operation, each of the video buffer 232.1 and the audio buffer 242.1 may receive the media item via the rendering program 220.1. To tune the local clock 250.1, the player 200.1 ping the player 200.2. For example, the ping may include a query to determine a characteristic of how the player 200.2 is accessing the media item.

The pinging process is further described herein with respect to FIGS. 4A and 4B. For example, the ping may include a message or test to query when a previous signal was received by the player 200.1. The player 200.1 may then ping the player 200.2. A time of transmit, time of receipt, and/or delay in the communication link between the device 200.1 and the device 200.2 may provide information about the sample rate of each of the systems 200.1 and 200.2. Based on the sample rate, drift, delay, and other characteristics indicating de-synchronization between the systems 200.1 and 200.2 may be identified. A rate scalar may be formed to correct the de-synchronization. The rate scalar may be transmitted by the time sync manager 210.1 to the ASRC 222.1. The ASRC 222.1 may perform sample rate conversion based on the rate scalar such that the player 200.1 and the player 200.2 output samples synchronously.

Although FIG. 2 illustrates the first and second players 200.1, 200.2 as having similar architectures, in practice, the capabilities of the two devices need not be the same. For example, the players 200.1, 200.2 may employ different components that determine the capabilities of the functional units illustrated. Further, it is not necessary that all players 200.1, 200.2 have all rendering systems. A wireless speaker, for example, need not include a video rendering system 240.2; it may render only the audio components within a media item. Similarly, a standalone monitor need not include an audio rendering system 230.2; it may render only the video components of a media item. Nevertheless, such devices may employ techniques discussed herein to synchronize their rendering with other devices that may render all components of the media item or complementary components of the media item.

Figure 3A:
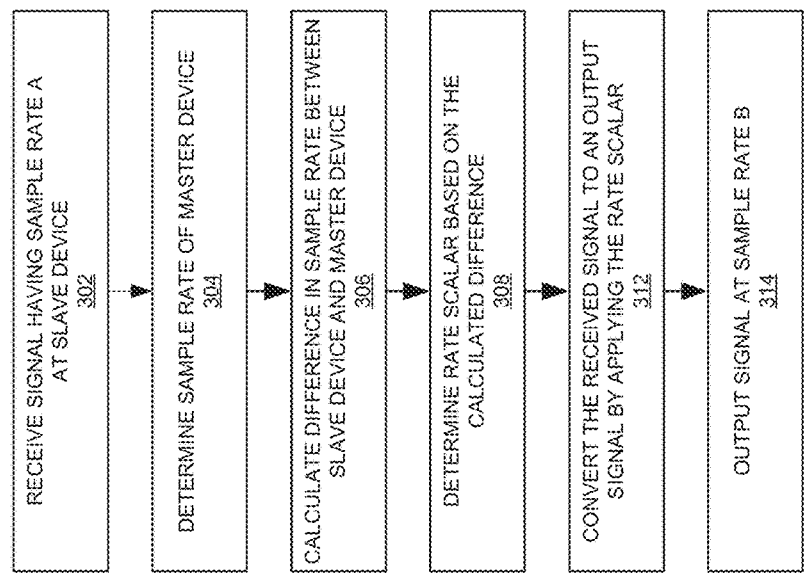
FIG. 3A a flowchart illustrating a method for clock synchronization to an embodiment of the present disclosure.

FIG. 3A shows a method 300 for performing sample rate conversion according to an embodiment of the present disclosure. The method 300 may convert a sample rate for a slave device such that playback of the slave device is synchronized to playback of a master device. The method 300 may receive a signal at a first device (box 302). In an embodiment, the first device is a slave device. The slave device may receive the signal at a first sample rate, "sample rate A." The method 300 may determine a sample rate of a second device (box 304). In an embodiment, the second device may be a master device. The method 300 may calculate a difference in sample rate between the slave device and the master device (box 306). Based on the difference, the method 300 may determine a rate scalar (box 308). The method 300 may then apply the rate scalar to convert the received signal to a second sample rate (box 312). In an embodiment, playback at a second sample rate may correct any de-synchronization or drift in the signal. The method 300 may output the signal at the second sample rate (box 314). By doing so, samples may appear to be consumed at a same rate such that outputs are synchronized.

FIG. 3B is a conceptual diagram illustrating operation of the method shown in FIG. 3A on an input signal according to an embodiment of the present disclosure. A same input signal may be received by each of Player 1 and Player 2. Each of Player 1 and Player 2 may have a sampling rate defined by a clock device. In the example illustrated in FIG. 3B, Player 1 may be relatively fast, picking up more samples compared with Player 2. Player 1 and Player 2 may be become out of sync due to the differing sampling rates. A first rate scalar may be applied to Player 1 and a second rate scalar may be applied to Player 2. The first rate scalar and/or the second rate scalar may be calculated according to the methods described herein such that the output of each of Player 1 and Player 2 are synchronized despite their different sampling rates.

FIG. 4A shows a method 400 for calculating differences in sample rates between two devices according to an embodiment of the present disclosure. The method 400 may be performed as part of another method, e.g., method 300 shown in FIG. 3A. For example, the method 400 may be performed as part of box 306. In an embodiment, the method 400 may be performed by a device ("slave device") that is to be synchronized with another device ("master device"). In an alternative embodiment, differences in sample rates between two devices may be determined according to conventional techniques such as IEEE 1588 (PTP).

The method 400 may send a ping at time T1 to a slave device (box 452). The method 400 may receive a response to the ping at time T4 (box 454). Based on the response time and any known processing and/or network delay, the method 400 may determine an elapsed time (box 456). In an embodiment, the determined elapsed time may be based on each of time T1, T2, T3, and T4, which may be known to the master device. The elapsed time may indicate de-synchronization between the master device and the slave device. The ping may determine latency through the network, a relationship of a master clock to a slave clock, a relationship of a master clock to a network clock, and the like. In one aspect, the relationship of a master clock to a network clock or the relationship of a master clock to a slave clock may be based on their current offset and/or their related rate skew. The determined information may be used to derive a rate scalar, as further described herein. The master device and slave device may adjust playback of media against their respective local clocks to achieve synchronized playback.

In an embodiment, the method 400 may query the master device as to when a previous signal was received and/or played. Any difference between the receipt and/or playing of the previous signal reflects de-synchronization between clocks of the master device and the slave device. To resynchronize the clocks, the device that receives a signal first should delay playback of that signal until the other device also is ready to play the signal. Introducing delay of playback may be made according to a rate scalar. In an embodiment, a rate scalar may be calculated based on (device sample rate 1)/(device sample rate 2), where device sample rate1 may be a sample rate of a first device and device sample rate2 may be a sample rate of a second device. In an embodiment, the sample rates of each of the devices may be measured according to a same clock. In an embodiment, the first device may be a slave device and the second device may be a master device such that applying the rate scalar to the master device and/or the slave device would cause synchronized output of a signal.

A rate scalar may be applied by a respective ASRC of a device for performing sample rate conversion so that samples appear to be consumed at a common clock rate. Thus, regardless of clock variations, samples may be played back synchronously by adjusting the ASRC according to the rate scalar. In an embodiment, the rate scalar is dynamically adjusted during playback. This may accommodate delays that may arise and change throughout the course of receiving and playing back a file.

FIG. 4B is a conceptual diagram of a system 450 for calculating differences in sample rates between two devices according to an embodiment of the present disclosure. A master device may initiate a ping at time T1. The slave device may receive the ping at time T2. The slave device may then initiate a response at time T3. The master device may receive the response at time T4. The communication network (not shown) between the master device and the slave device may include some delay, "communication link delay." The master device may determine a degree of de-synchronization between the master device and the slave device by accounting for processing time and the communication link delay.

The methods and systems described herein may be applied to heterogeneous systems. For example, a plug-in may enable clock synchronization regardless of underlying hardware, e.g., a type of clock device used. Thus, a third party application, which may be unfamiliar with hardware of receiving devices may nevertheless cause synchronized playback at each of the recipient devices.

In an embodiment, the methods and systems described herein may be implemented for input devices. For example, the speaker hardware 224, 226 shown in FIG. 2 may be implemented as microphones. In a conventional system, simultaneous recording may become out of sync over time due to drift. For example, the recording of a symphony concert may involve multiple recording devices. Over the course of the recording, the recorded parts may become out of sync. In some instances, drift may occur over the course of a recording session lasting several hours or more. According to embodiments of the present disclosure, recording of samples generated at a same time may be advantageously synchronized such that drift does not occur. For example, in an embodiment, a method may identify a location of a sound captured by a distributed microphone array.

In another embodiment, the methods and systems described herein may be implemented for output devices such as devices for music playback. Music playback may be for groups of devices in close proximity to each other, e.g., an ad hoc wireless network. Other groups of devices may be dispersed in various time zones and geographical locations. In either case, music may be played at the devices synchronously according to the methods and systems described herein.

In yet another embodiment, the methods and systems described herein may be implemented for other devices such as lights, water fountains, and the like. For example, a light show may be synchronized according to the methods and systems described herein. As another example, a choreographed fountain performance may be synchronized according to the methods and systems described herein.

Figure 5:
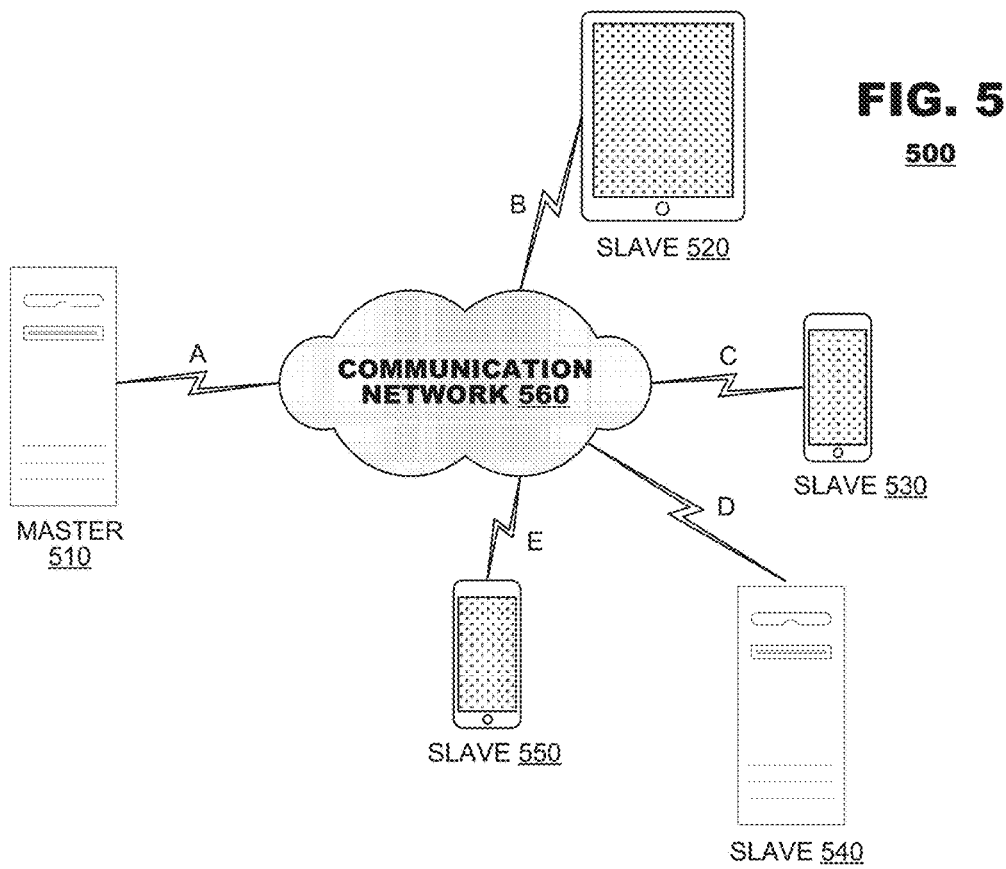
FIG. 5 is a block diagram of a multi-terminal system implementing the methods and systems described herein.

FIG. 5 illustrates a simplified block diagram of a multi-terminal media sharing system 500 according to an embodiment of the present disclosure. The system 500 may include at least two terminals. As shown, terminals 510-550 are interconnected via a network 560. In an embodiment, the terminal 510 may be a master and the terminals 520-550 may each be a slave.

For unidirectional transmission of data, the master terminal 510 may code data at a local location for transmission to the slave terminals 520-550 via the network 560. The slave terminals 520-550 may receive the coded data of the master terminal 510 from the network 560, decode the coded data and playback the recovered data. Unidirectional data transmission is common in media serving applications and the like.

For bidirectional transmission of data, however, each terminal 510-550 may code data captured at a local location for transmission to the other terminal via the network 560. Each of the terminals 510-550 also may receive the coded data transmitted by the other terminals, may decode the coded data and may playback the recovered data at a local device.

In FIG. 5, the terminals 510-550 are variously illustrated respectively as servers, a tablet, and smart phones, but the principles of the present disclosure are not so limited. Embodiments of the present disclosure find application with laptop computers, tablet computers, servers, media players and/or dedicated video conferencing equipment. Also, although terminal 510 is illustrated as a master and terminals 520-550 are illustrated as slaves, any terminal may be designated a master or a slave. The network 560 represents any number of networks that convey coded video data among the terminals 520-550, including, for example, wireline and/or wireless communication networks. The communication network 560 may exchange data in circuit-switched and/or packet-switched channels. Representative networks include telecommunications networks, local area networks, wide area networks and/or the Internet. For the purposes of the present discussion, the architecture and topology of the network 560 is immaterial to the operation of the present disclosure unless explained herein below.

The methods and systems described herein used two terminals. However, they are equally applicable to multiple terminals. As described herein, one terminal may be designated a master, and the other terminals slaves. The slaves may synchronize to the master terminal by each calculating a rate scalar for application during a sample rate conversion process. Thus, playback may be synchronized. As shown, the communication links A-E may use one or more different protocols. The synchronization methods describe herein may be implemented according to standardized and/or propriety protocols for synchronization throughout a computer network. Example protocols include: Internet Authentication Service (IAS), Precision Time Protocol (PTP), and serial time protocol (STP). The terminals 510-550 are able to be synchronized regardless of the type of protocol used by implementing the methods described herein.

Figure 6:
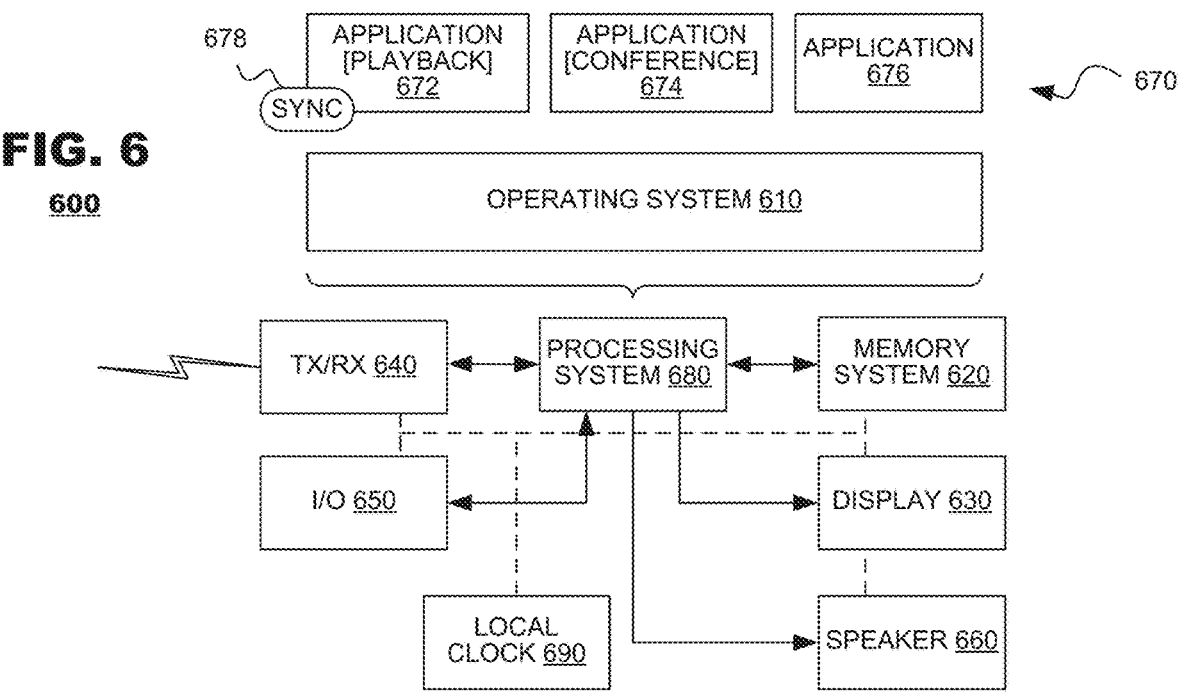
FIG. 6 is a functional block diagram of a terminal according to an embodiment of the present disclosure.

FIG. 6 is a functional block diagram of a terminal 600 according to an embodiment of the present disclosure. The terminal 600 may include a processing system 680, memory system 620, display 630, transceiver (TX/RX) 640, and input/output (I/O) units 650.

The processing system 680 may control operation of the terminal 600 by causing the terminal 600 to interact with other entities, such as those illustrated in FIGS. 1, 2, and 5, to synchronize media playback. The memory system 620 may store instructions that the processing system 680 may execute and also may store application data generated therefrom. The architecture of the processing system 680 may vary from terminal to terminal. Typically, the processing system 680 will include a central processing unit; it also may include graphics processors, digital signal processors and application specific integrated circuits (not shown) as may be suitable for individual application needs. The architecture of the memory system 620 also may vary from terminal to terminal. Typically, the memory system 620 will include one or more electrical, optical and/or magnetic storage devices (also not shown). The memory system 620 may be distributed throughout the processing system. For example, the memory system may include a cache memory provided on a common integrated circuit with a central processor of the processing system 680. The memory system 620 also may include a random access main memory coupled to the processing system 680 via a memory controller and it also may include non-volatile memory device(s) for long term storage.

The processing system 680 may execute a variety of programs during operation, including an operating system 610 and one or more application programs 670. For example, as illustrated in FIG. 6, the terminal 600 may execute a media rendering application 672, a conferencing application 674, along with possibly other applications. The media rendering application 672 may manage download, decoding, and synchronized output of media items as described in the foregoing discussion. The conferencing application 674 may support conferencing exchange between the terminal 600 and another terminal (not shown) as discussed.

The rendering application 672 may define a set of synchronization controls 678 for management of the application. Thus, synchronization controls may vary according to the output use case for which the terminal 600 is applied Although the foregoing description includes several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

As used in the appended claims, the term "computer-readable medium" may include a single medium or multiple media, such as a centralized or distributed database, and/or associated caches and servers that store one or more sets of instructions. The term shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

The present specification describes components and functions that may be implemented in particular embodiments which may operate in accordance with one or more particular standards and protocols. However, the disclosure is not limited to such standards and protocols. Such standards periodically may be superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

For example, operation of the disclosed embodiments has been described in the context of servers and terminals that implement video compression, coding, and decoding. These systems can be embodied in electronic devices or integrated circuits, such as application specific integrated circuits, field programmable gate arrays and/or digital signal processors. Alternatively, they can be embodied in computer programs that execute on personal computers, notebook computers, tablets, smartphones or computer servers. Such computer programs typically are stored in physical storage media such as electronic-, magnetic- and/or optically-based storage devices, where they may be read to a processor, under control of an operating system and executed. And, of course, these components may be provided as hybrid systems that distribute functionality across dedicated hardware components and programmed general-purpose processors, as desired.

In addition, in the foregoing Detailed Description, various features may be grouped or described together the purpose of streamlining the disclosure. This disclosure is not to be interpreted as reflecting an intention that all such features are required to provide an operable embodiment, nor that the claimed embodiments require more features than are expressly recited in each claim. Rather, as the following claims reflect, subject matter may be directed to less than all of the features of any of the disclosed embodiments. Thus, the following claims are incorporated into the Detailed Description, with each claim standing on its own as defining separately claimed subject matter.

Also, where certain claims recite methods, sequence of recitation of a particular method in a claim does not require that that sequence is essential to an operable claim. Rather, particular method elements or steps could be executed in different orders without departing from the scope or spirit of the invention.

What is claimed is:

1. A system, comprising:
a time synchronization manager configured to:
determine a difference between a first sample rate of the system and a second sample rate of an external device based on timing of communications between the system and the external device and on the communications' delay time; and
determine a rate scalar based on the difference between the first sample rate and the second sample rate;
a clock device communicatively coupled to the time synchronization manager and configured to define the first sample rate;
a sample rate converter configured to convert a received signal to an output signal based on the rate scalar;
input/output hardware configured to output the output signal synchronously with an output of the external device.

2. The system of claim 1, wherein a protocol for a first communication link between the system and the external device and a protocol for a second communication link between the system and the external device are different from each other.

3. The system of claim 2, wherein the protocol for the first communication link includes at least one of: Internet Authentication Service (IAS), Precision Time Protocol (PTP), and serial time protocol (STP).

4. The system of claim 2, wherein the protocol for the second communication link includes at least one of: Internet Authentication Service (IAS), Precision Time Protocol (PTP), and serial time protocol (STP).

5. The system of claim 1, wherein the received signal is an audio signal.

6. The system of claim 1, wherein the received signal is a video signal.

7. The system of claim 1, wherein the received signal is a light signal.

8. The system of claim 1, wherein the output signal is an audio signal.

9. The system of claim 1, wherein the output signal is a video signal.

10. The system of claim 1, wherein the output signal is a light signal.

11. The system of claim 1, wherein the input/output hardware is a microphone.

12. The system of claim 1, wherein the input/output hardware is a speaker.

13. The system of claim 1, wherein the input/output hardware is a renderer.

14. A media synchronization method implemented by a computer, comprising:
receiving a signal;
determining a first sample rate of an external device;
calculating a difference between a second sample rate of the computer and the first sample rate based on timing of communications between the computer and the external device and on the communications' delay time;
determining a rate scalar based on the calculated difference;
converting the received signal by applying the rate scalar; and
outputting the converted signal such that the output signal is synchronized with an output of the external device.

15. The method of claim 14, wherein the calculating a difference between the first sample rate and the second sample rate includes:
  sending a query to the external device at a first time;
  receiving a response to the query at a second time;
  determining a delay of a network over which the query is sent;
  determining a level of de-synchronization based on a difference between the first time and the second time less the network delay; and
  determining the difference between the first sample rate and the second sample rate based on the determined level of de-synchronization.

16. The method of claim 14, wherein a protocol for a first communication link between the computer and the external device and a protocol for a second communication link between the computer and the external device are different from each other.

17. The method of claim 14, wherein the received signal is one of an audio signal, a video signal, or a light signal.

18. A non-transitory computer-readable medium storing program instructions that, when executed, cause a processor to perform a method, the method comprising:
  receiving a signal;
  determining a first sample rate of an external device;
  calculating a difference between a second sample rate of the computer and the first sample rate based on timing of communications between the computer and the external device and on the communications' delay time;
  determining a rate scalar based on the calculated difference;
  converting the received signal by applying the rate scalar; and
  outputting the converted signal such that the output signal is synchronized with an output of the external device.

19. The medium of claim 18, wherein a protocol for a first communication link between the computer and the external device and a protocol for a second communication link between the computer and the external device are different from each other.

20. The medium of claim 18, wherein the received signal is one of an audio signal a video signal, or a light signal.

21. The method of claim 14, wherein the output signal is one of an audio signal, a video signal, or a light signal.

22. The method of claim 14, wherein the input/output hardware is one of a microphone, a speaker, or a renderer.

23. The medium of claim 18, wherein the output signal is one of an audio signal, a video signal, or a light signal.

24. The medium of claim 18, wherein the input/output hardware is one of a microphone, a speaker, or a renderer.

* * * * *